Mar. 13, 1923.                                              1,448,268
G. GASPARRI ET AL
RESILIENT SUSPENSION FOR VEHICLE WHEELS
Filed Jan. 2, 1920

Inventor
G. Gasparri
And
A. Casini
By  H. B. Williamson & Co.
Attorneys

Patented Mar. 13, 1923.

1,448,268

UNITED STATES PATENT OFFICE.

GIUSEPPE GASPARRI AND ALESSANDRO CASINI, OF ROME, ITALY.

RESILIENT SUSPENSION FOR VEHICLE WHEELS.

Application filed January 2, 1920. Serial No. 348,993.

*To all whom it may concern:*

Be it known that we, GIUSEPPE GASPARRI and ALESSANDRO CASINI, residing at Rome, in the Kingdom of Italy, have invented a certain new and useful Improvement in Resilient Suspension for Vehicle Wheels, of which the following is a description.

The present invention relates to improvements in means for attaching in a resilient way the wheels to the frame of a vehicle. Purpose of the invention is to attain a perfect equilibrium of the frame of a running vehicle, and its complete resiliency also when the wheels of said vehicle are provided with steel tires or solid rubber tires.

The invention comprises the combination of several parts which with their operation effect a mechanical and functional working of the wheels of a vehicle independent each from the other and also from the frame of the running vehicle, this latter maintaining, in force of its inertia, its relative movement also under the action of the disturbing conditions of the road, viz, stones, holes, obstacles, wheel tracks and the like, obtaining a perfect equilibrium of the frame. The mechanical working of each single wheel is controlled by a compensating device whose action is retarded by the action of a spring, or through convenient resilient means, attached to the frame, said means serving to attenuate the oscillating movements of the compensating device, to return the wheel to its normal position, and prevent the transmission of the shock to the frame of the vehicle.

The invention, particularly when applied to automobiles, permits to eliminate the usual pneumatic tires, the wheel being equipped with solid rubber tires and also with steel tires.

For a better understanding of the invention, the same is now described with reference to the accompanying drawing, which illustrates one preferred form of the invention.

Figure 1:
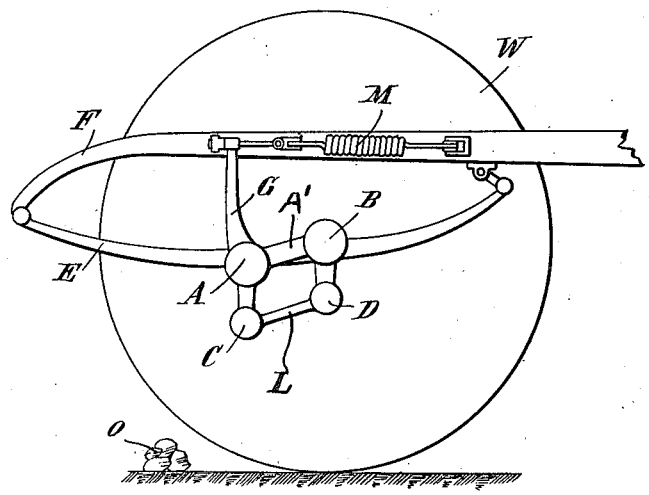
Fig. 1 is a side elevation of the device applied to the front wheels of an automobile.
Figure 2:
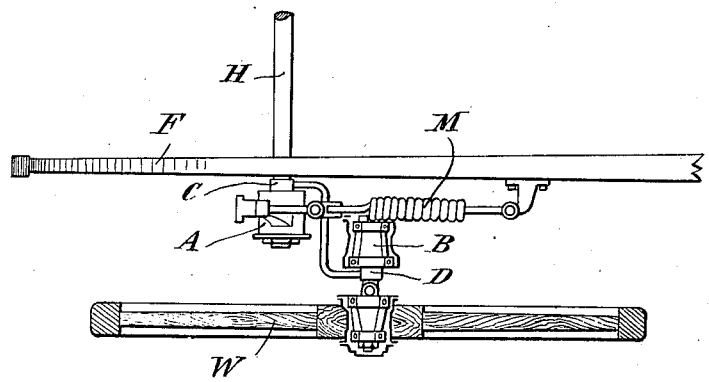
Fig. 2 is a plan view of the same.

In the drawings there has been shown a front wheel mounted in the improved manner and it is to be understood that the rear wheels will be mounted in the same manner, the only change necessary being to provide for the rear wheels a stub axle which is in one piece throughout its length instead of providing a pivoted spindle section to permit turning of the front wheel. The chassis bar F is of the usual construction and carries a spring E which is mounted beneath the chassis bar in the usual manner and the main axle will have its end portions connected with the springs in the usual manner. The wheel W is of the usual construction and will be mounted upon the stub axle B which in the present illustration is provided with a spindle portion pivotally mounted to permit turning of the wheel. In order to mount the wheel carrying stub axle and prevent the stub axle from turning when the chassis has vertical movement relative to the wheel and road over which the vehicle is passing, there has been provided a special axle mounting which will now be described.

A bell crank lever which is indicated in general by the letter A is pivotally mounted upon a spindle-shaped end portion of the main axle H and this bell crank lever is provided with arms A' and G which extend substantially horizontally and vertically in their normal positions. The upwardly extending arm G of this bell crank lever has its upper end portion connected with a spring M which extends longitudinally of the chassis bar and is anchored to the same. The arm A' of the bell crank lever which extends horizontally when the bell crank lever is in the normal position is pivotally connected with the stub axle B so that when the bell crank lever moves against the action of the spring M and the arm A' swings vertically and then returns to the normal position, the stub axle may be held against rotary movement and the pivot pin between the inner end portion and spindle forming outer end portion of the stub axle retained in a vertical position. In order to retain the stub axle in the desired position with the pivot pin extending vertically, there has been provided depending arms C and D, the depending arm C being rigid upon the spindle portion of the main axle H and the depending arm D being rigid upon the stub axle B. At their lower ends, the depending arms C and D are connected by a link L which is pivotally mounted at its ends. Therefore, when the bell crank lever swings upon the spindle portion of the main axle, the link L which extends parallel to the arm A' of the bell crank lever and is pivotally mounted at its ends to the arms C and D, will retain the arm D parallel to the depending arm C and the pivot for the spindle portion of the stub axle will be held in the vertical position. This structure would of course also serve to prevent the spindle for the rear wheel from turning in the hub of the rear wheel. Since the pivot for the spindle portion of the forward stub axle will be held in the vertical position, the steering mechanism of the automobile cannot be damaged. It should be further noted that since each of the wheels will be provided with the mounting means shown, each wheel will be permitted of vertical movement independent of the remaining wheel and therefore if one wheel should pass over an obstruction in the road, it would not have any effect upon the remaining wheels and there would be no tendency to twist the chassis frame.

Having now particularly described and ascertained the nature of our invention and in what manner the same is to be performed, what we claim is:

1. In a structure of the character described, a chassis frame including side bars, springs connected with the side bars and an axle carried by said springs and wheel-mounting means comprising a bell crank lever pivotally mounted upon said main axle and having one arm normally extending horizontally and its other arm normally extending vertically, spring means anchored to the chassis bar and connected with the vertical arm to yieldably retain the bell crank lever in a normal position, a stub axle having the horizontally disposed arm of the bell crank lever pivotally connected therewith, a depending arm rigid with said main axle, a depending arm rigid with said stub axle, and a link having one end portion pivotally connected with the depending arm of the main axle and its other end pivotally connected with the depending arm of the stub axle.

2. A wheel-mounting structure comprising a bell crank lever adapted to be pivotally mounted upon a main vehicle axle with one arm extending horizontally, means yieldably holding said bell crank lever against swinging movement, a depending arm for rigid connection with the main axle, a stub axle having the horizontal arm of the bell crank lever loosely connected therewith, a depending arm rigid with said stub axle, and a link pivotally connected with said depending arm and extending between the same.

3. A wheel-mounting structure comprising a lever for pivotal connection with a main axle with one end portion normally extending horizotnally, resilient means connected with the other end portion of said lever to yieldably hold the same against swinging movement, an arm for rigid connection with the axle in a depending position, a wheel-carrying stub axle loosely connected with the horizontally disposed end portion of said lever, a depending arm rigid with said wheel carrying stub axle, and means loosely connected with said depending arm to retain said arms parallel to each other when said lever swings upon the main axle.

In testimony whereof we have hereunto signed our names in the presence of two witnesses.

GIUSEPPE GASPARRI.
ALESSANDRO CASINI.

Witnesses:
  DUILIO NARDONI,
  BARTOLUZZI TOMMASSO.